US010715611B2

(12) United States Patent
Edwin et al.

(10) Patent No.: US 10,715,611 B2
(45) Date of Patent: Jul. 14, 2020

(54) DEVICE CONTEXT-BASED USER INTERFACE

(71) Applicant: Adobe Inc., San Jose, CA (US)

(72) Inventors: Anand Samuel Edwin, Bangalore (IN); Charan Raj, Bangalore (IN); Rahul Kumar Agrawal, Ramgarh Cantt (IN); Senthilkumar PanneerSelvam, Bangalore (IN); Jyothi Krishna V S, Thiruvananthapuram (IN)

(73) Assignee: Adobe Inc., San Jose, CA (US)

( * ) Notice: Subject to any disclaimer, the term of this patent is extended or adjusted under 35 U.S.C. 154(b) by 25 days.

(21) Appl. No.: 14/020,579

(22) Filed: Sep. 6, 2013

(65) Prior Publication Data
US 2015/0074543 A1 Mar. 12, 2015

(51) Int. Cl.
*G06F 3/0484* (2013.01)
*H04L 29/08* (2006.01)
(Continued)

(52) U.S. Cl.
CPC ............ *H04L 67/22* (2013.01); *G06F 3/0231* (2013.01); *G06F 3/038* (2013.01); *G06F 3/0484* (2013.01);
(Continued)

(58) Field of Classification Search
CPC .......... G06F 3/038; G06F 3/0412; G06F 3/01; G06F 3/0484; H04L 67/22
See application file for complete search history.

(56) References Cited

U.S. PATENT DOCUMENTS

| 2003/0046401 A1* | 3/2003 | Abbott | G06F 9/451 709/228 |
| 2005/0149870 A1* | 7/2005 | Van Ee | H04B 1/205 715/700 |

(Continued)

FOREIGN PATENT DOCUMENTS

| CN | 1503961 | 6/2004 |
| CN | 101479722 | 7/2009 |

(Continued)

OTHER PUBLICATIONS

"Foreign Office Action", GB Application No. 1415310.0, dated May 11, 2017, 2 pages.
(Continued)

*Primary Examiner* — Seth A Silverman
(74) *Attorney, Agent, or Firm* — SBMC

(57) ABSTRACT

Device context-based user interface techniques are described. In one or more embodiments, a context is determined for a device based on a configuration of hardware associated with the device. When the configuration of hardware associated with the device changes, the context of the device may also change. Based on the determined context of the device, a user interface configuration may be selected for display. For example, when the device is connected to a mouse or a keyboard a user interface configuration may be selected that facilitates interactions performed substantially with a mouse and keyboard. However, when a mouse and keyboard are not connected to the device, but touch functionality of the device is used, a user interface configuration may be selected that facilitates interactions performed substantially using the touch functionality. A user interface for an application may be configured using the selected user interface configuration.

20 Claims, 5 Drawing Sheets

(51) Int. Cl.
  *G06F 3/023* (2006.01)
  *G06F 3/0488* (2013.01)
  *G06F 3/038* (2013.01)
(52) U.S. Cl.
  CPC .... *G06F 3/0488* (2013.01); *G06F 2203/0384* (2013.01)

(56) References Cited

U.S. PATENT DOCUMENTS

| | | | |
|---|---|---|---|
| 2006/0105712 A1* | 5/2006 | Glass et al. | 455/41.2 |
| 2006/0206628 A1* | 9/2006 | Erez | 710/8 |
| 2006/0209016 A1* | 9/2006 | Fox | G06F 3/038 345/156 |
| 2008/0005679 A1* | 1/2008 | Rimas-Ribikauskas | G01C 21/3688 715/745 |
| 2008/0147684 A1* | 6/2008 | Sadovsky | H04L 67/22 |
| 2008/0177904 A1* | 7/2008 | Storey et al. | 710/10 |
| 2009/0293017 A1* | 11/2009 | Carter | G06F 3/0481 715/811 |
| 2009/0300511 A1 | 12/2009 | Behar et al. | |
| 2010/0146506 A1* | 6/2010 | Lee et al. | 718/1 |
| 2011/0126119 A1* | 5/2011 | Young | G06F 16/9577 715/744 |
| 2011/0248838 A1 | 10/2011 | Krahenbuhl et al. | |
| 2013/0187855 A1* | 7/2013 | Radakovitz et al. | 345/163 |
| 2013/0191625 A1* | 7/2013 | Mullens | G06F 9/4411 713/100 |
| 2013/0191779 A1* | 7/2013 | Radakovitz et al. | 715/800 |
| 2014/0368421 A1* | 12/2014 | Smus | G06F 3/038 345/156 |

FOREIGN PATENT DOCUMENTS

| | | |
|---|---|---|
| CN | 101573702 | 11/2009 |
| CN | 102591559 | 7/2012 |
| DE | 102014011901 | 3/2015 |

OTHER PUBLICATIONS

"Foreign Office Action", GB Application No. 1415310.0, dated Jan. 30, 2017, 8 pages.
"Foreign Office Action", GB Application No. 1415310.0, dated Feb. 2, 2016, 6 pages.
"Foreign Office Action", GB Application No. 1415310.0, dated Jul. 22, 2016, 4 pages.
"Combined Search and Examination Report", GB Application No. 1415310.0, dated Mar. 9, 2015, 9 pages.
"Foreign Office Action", CN Application No. 20140172320.5, dated Jul. 9, 2018, 29 pages.
"Foreign Office Action", CN Application No. 201410172320.5, dated Jan. 25, 2019, 11 pages.

* cited by examiner

DEVICE CONTEXT-BASED USER INTERFACE

BACKGROUND

The configuration of computing devices is ever increasing. For example, use of computing devices expanded with the advent of desktop personal computers. Configurations of personal computers continued to expand and thus so too did the pervasiveness of computing devices in everyday life, such as from the desktop computer to laptop computers, netbooks, mobile communications devices such as mobile phones and tablet computers, and so on.

As these configurations continue to expand, there is an increasing focus in some instances on making a single device that is usable in a variety of different configurations. A user of a tablet device may, for instance, connect the tablet device to a mouse and keyboard so that the mouse and keyboard may be used to provide input to the tablet device. At other times, the user may use a stylus to provide input to the tablet device. Further, the user may not use the tablet device with any additional input devices but may instead interact with the tablet device simply using touch functionality of the tablet device. In some conventional approaches, an application may display a same user interface regardless of whether a user interacts with the application using a mouse and keyboard, a stylus, or just touch functionality. In other conventional approaches, an application may support interactions involving just one particular configuration of the device, e.g., using touch functionality but not using a mouse and keyboard. However, these approaches may hamper experience of a user.

SUMMARY

Device context-based user interface techniques are described. In one or more embodiments, a context is determined for a device based on a configuration of hardware associated with the device. When the configuration of hardware associated with the device changes, the context of the device may also change. Based on the context of the device, a user interface configuration may be selected for display. For example, when the device is connected to a mouse or a keyboard a user interface configuration may be selected that facilitates interactions performed substantially with a mouse and keyboard. However, when a mouse and keyboard are not connected to the device, but touch functionality of the device is used, a user interface configuration may be selected that facilitates interactions performed substantially using the touch functionality. A user interface for an application may be configured using the selected user interface configuration.

Additionally, the context of the device may change when a change to the configuration of hardware associated with the device is detected. When the configuration of hardware associated with the device changes, the device context may also change to reflect the changed hardware configuration. Based on the changed context of the device, a different user interface configuration may be selected. Consequently, the user interface of the application may be reconfigured "on the fly" for display using the different user interface configuration. Further, the context of the device may be determined based on interactions of a user with the device. For example, if a user interacts with the device predominantly using touch functionality, the context may be determined to reflect that the user's interactions are predominantly touch-based. Thus, a user interface configuration may be selected that facilitates touch-based interactions, and a user interface of an application configured accordingly.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
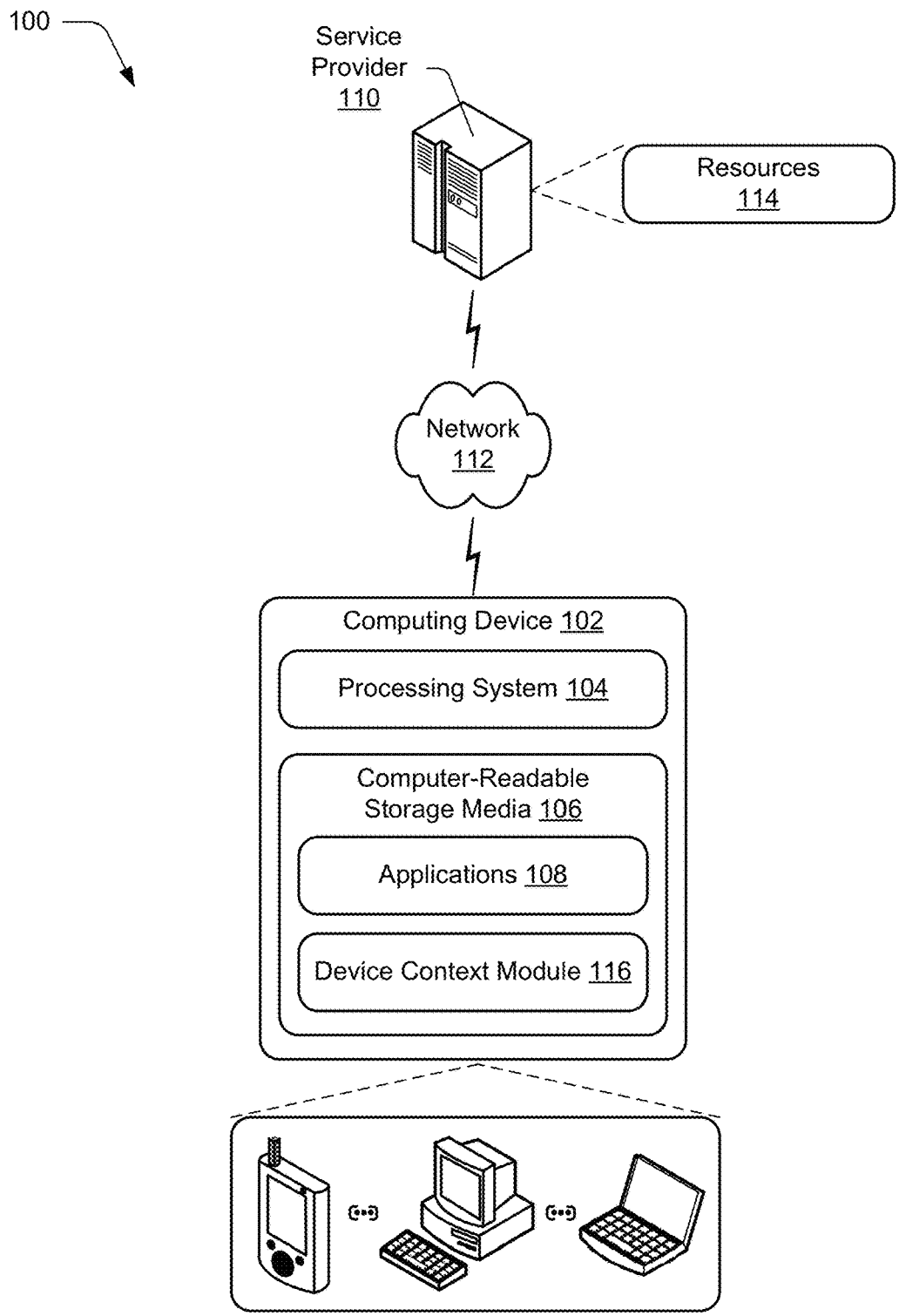
FIG. 1 is an illustration of an environment in an example embodiment that is operable to employ techniques described herein.

The way in which people interact with computing devices is ever changing. Traditionally, people worked using computing devices in clearly defined places because these devices lacked mobility. The many devices now available and the mobility that these devices provide, enable users to work in various contexts. Photo editing for example may be performed in a variety of environments with a variety of devices. Basic photo editing operations, such as photo cropping, can be performed while a user is traveling on a plane. Alternately, users can leisurely touchup their photos using a tablet while sitting on a couch, co-edit photos with their family in a living room, or work in a traditional work environment with a desktop to perform advanced photo editing operations such as pixel selection and manipulation, compositing layers, applying content aware fills, applying filters, and so on. Thus, photo editing can be done in a variety of contexts. Additionally, devices utilized to perform these editing operations are configurable in different ways to enable usage of a single device in a variety of contexts. A tablet device, for instance, may be docked with a mouse and keyboard, and thus used like a traditional desktop. On the other hand, a user may disconnect hardware coupled to the tablet and simply use touch functionality of the tablet.

However, conventionally designed applications have not provided users with the ability to conveniently switch to follow different configurations of a device, e.g., between one configuration of a device and then another. Consequently, users may be limited in the ways in which they interact with applications using a device, in part, because conventional techniques for using different device configurations with applications are cumbersome.

Device context-based user interface techniques are described. In one or more embodiments, a context is determined for a user interface of a device based on a configuration of hardware associated with the device. When the configuration of hardware associated with the device changes, the context of the user interface may also change. Thus, a user interface configuration may be selected for display based on the determined context of the device. For example, when the device is connected to a mouse or a keyboard a user interface configuration may be selected that facilitates interactions performed substantially with a mouse and keyboard. However, when a mouse and keyboard are not connected to the device, but touch functionality of the device is used, a user interface configuration may be selected that facilitates interactions performed substantially using the touch functionality. Consequently, the user interface of an application may be reconfigured for display using the different user interface configuration.

Further, the context of the device may also be determined based on interactions of a user with the device. For example, if a user interacts with the device using predominantly touch functionality, the context may be determined to reflect that the user's interactions are predominantly touch-based. Thus, a user interface configuration may be selected that facilitates touch-based interactions, and a user interface of an application configured for accordingly.

In one or more embodiments, the term "context", as used herein, may refer to a variety of different ways or "modes" in which a user may interact with a computing device. For example, a user may interact with a computing device in a "casual" context, a "desktop" context, a "professional" context, a "group" context, a "fun" context, and so on. Note also that, as used herein, the term "hardware configuration" may refer to a configuration of devices connected internally or externally to a computing device. These devices may be physically coupled to the computing device, such as using cables or included in a housing of the device. Additionally or alternately, the devices included as part of the hardware configuration may be connected or associated with the computing device in other ways, such as wirelessly (e.g., over a wireless network, over a cellular network, over a Bluetooth connection, and so on). Note also that, as used herein, the term "user interface configuration" refers to a layout, arrangement, or functionality provided in association with the user interface. For example, user interface configuration may refer to a visual layout of a user interface, e.g., how the user interface is displayed. User interface configuration may also refer to hardware items that are enabled to receive input or provide output for interaction with a particular user interface. As used herein, the term "device" may not only refer to computing devices, such as those discussed below in relation to FIG. 5, but may also refer to handheld devices, such as a mobile device, a tablet computer, a stylus, a webcam, a mouse, a keyboard, and so on. This discussion of terms should not be construed to limit the scope of these terms, but rather merely as examples of the terms.

In the following discussion, an example environment is first described that may employ the techniques described herein. Example embodiment details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a computing device 102 having a processing system 104 that may include one or more processing devices (e.g., processors), one or more computer-readable storage media 106, and applications 108 embodied on the computer-readable storage media 106 and operable via the processing system 104 to implement corresponding functionality described herein. In at least some embodiments, applications 108 may include a browser of the computing device 102 operable to access various kinds of web-based resources (e.g., content and services). The applications 108 may also represent a client-side component having integrated functionality operable to access web-based resources (e.g., a network-enabled application), browse the Internet, interact with online providers, and so forth as described in further detail below.

The computing device 102 may be configured as any suitable type of computing device. For example, the computing device 102 may be configured as a desktop computer, a laptop computer, a mobile device (e.g., assuming a hand-held configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 5.

The environment 100 further depicts one or more service providers 110, configured to communicate with computing device 102 over a network 112, such as the Internet, to provide a "cloud-based" computing environment. Generally speaking, a service provider 110 is configured to make various resources 114 available over the network 112 to clients. In some scenarios, users may sign up for accounts that are employed to access corresponding resources from a provider. The provider may authenticate credentials of a user (e.g., username and password) before granting access to an account and corresponding resources 114. Other resources 114 may be made freely available, (e.g., without authentication or account-based access). The resources 114 can include any suitable combination of services and/or content typically made available over a network by one or more providers. Some examples of services include, but are not limited to, a photo editing service, an image illustrating service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

The computing device 102 may also include or make use of a device context module 116 that represents functionality to implement device context-based user interface techniques as described herein. For example, the device context module 116 may be configured in various ways to facilitate configuring user interfaces of applications to reflect a context of a device. To do so, the device context module 116 may be configured to first determine a context of a device, which may be performed in a variety of ways. As part of determining the context, for instance, the device context module 116 may determine a configuration of hardware associated with the device e.g., by a physical coupling, a wireless association, and so on. In this way, the device context module 116 may select a user interface configuration that supports the hardware with which the device is currently associated. In another instance, the device context module 116 may be configured to monitor a user's interactions with a device, and determine the context for the device based on the monitored user interactions. Thus, the device context module 116 may select a user interface configuration that also supports the way in which a user is currently interacting with a device or the way in which a user predominantly interacts with a device.

The device context module 116 may be implemented as a software module, a hardware device, or using a combination of software, hardware, firmware, fixed logic circuitry, etc. Further, the device context module 116 may be implemented as a standalone component of the computing device 102 as illustrated. In addition or alternatively, the device context module 116 may be configured as a component of an application 108, an operating system of the computing device 102, a plug-in module, or other device application.

In at least some embodiments, the device context module 116 is configured to operate in connection with content editing applications that may use application-specific and/or proprietary formats. By way of example and not limitation, one of the applications 108 may be configured as an image editor application one example of which is Adobe Photoshop™. Other content and image editor applications are also contemplated.

Having considered an example environment, consider now a discussion of some example details of the techniques for device context-based user interfaces in accordance with one or more embodiments.

Device Context-Based User Interface Details

Figure 2:
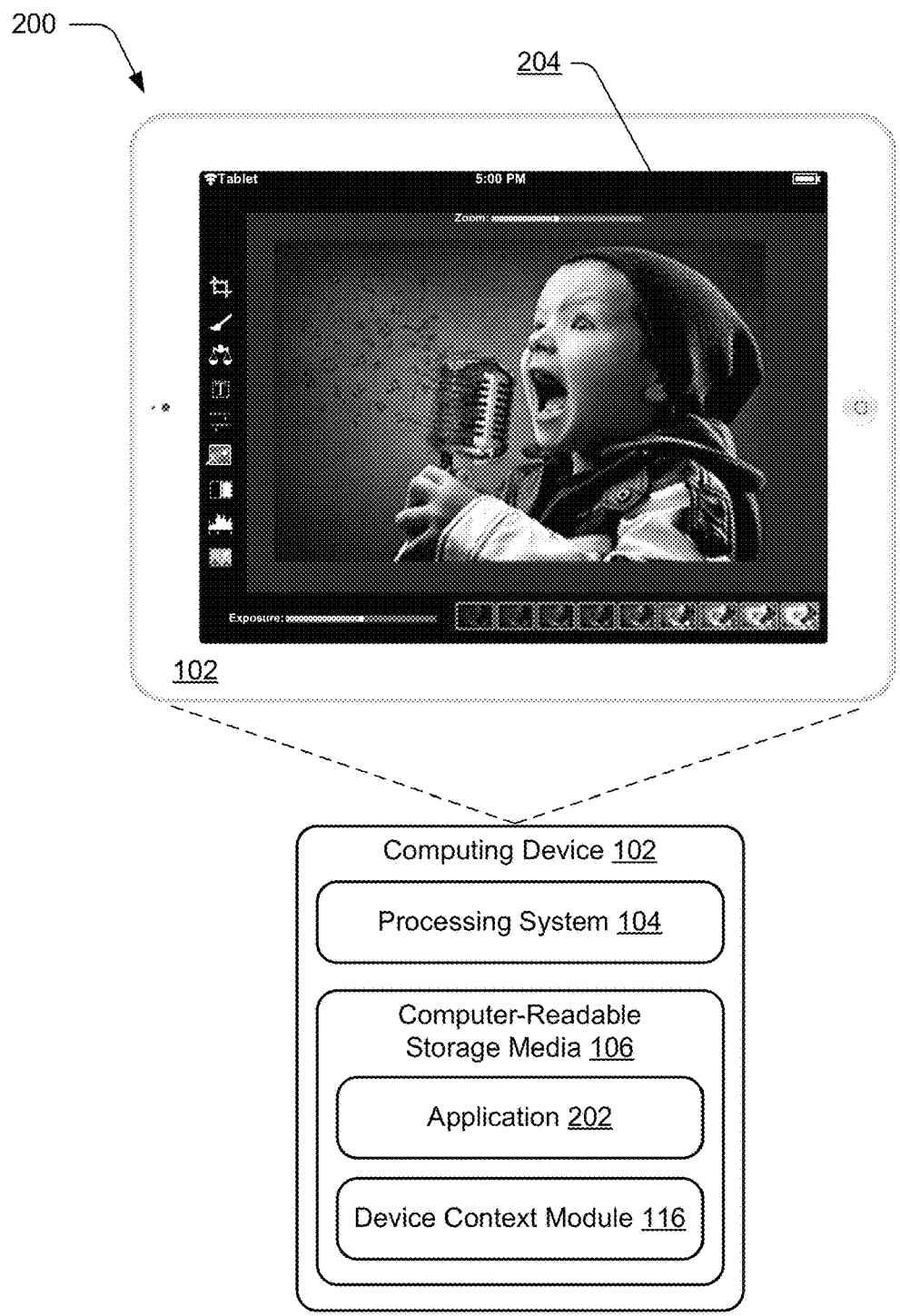
FIG. 2 illustrates portions of the environment from FIG. 1 in greater detail in accordance with one or more embodiments.

This section describes some example details of a device context-based user interface in accordance with one or more embodiments. FIG. 2 depicts generally at 200 some portions of the environment 100 of FIG. 1, but in greater detail. In particular, the computer-readable storage media 106 and the components included therein are depicted in greater detail. The computer-readable storage media 106 includes the device context module 116 as well as an application 202, which may correspond to one of the applications 108 depicted in FIG. 1.

In general, the device context module 116 is accessible to an application, such as application 202. In at least some embodiments, the device context module 116 may be included as part of the application 202. Thus, the device context module 116 may be specific to the application 202, and provide device-context based user interface functionality to the application 202 but not other applications. In other embodiments, the device context module 116 may be separate from the application 202 but accessible to the application 202. For example, the device context module 116 may be configured as a library available to the application 202, an application programming interface (API) available to the application and/or other applications, as a component of an operating system available to multiple applications running within the operating system, to the operating system itself, and so on. Other configurations of the device context module 116 may also be employed without departing from the spirit and the scope of the techniques described herein.

Regardless of how implemented, the device context module 116 may be configured to determine a context of the computing device 102. To do so, the device context module 116 may determine a configuration of hardware associated with the computing device 102. The device context module 116 may thereby select a context for the computing device based on the associated hardware. For instance, it may be determined that a mouse and keyboard are connected to the computing device 102. Consequently, the device context module 116 may determine that the context of the computing device 102 corresponds to a "desktop" context.

In another instance, it may be determined that a mouse and keyboard are not connected to the computing device 102, and that input is being provided to the computing device by a user via touch input. As a result, the device context module 116 may determine that the context of the computing device 102 corresponds to a different context (e.g., a "casual" context).

The device context module 116 may determine a variety of different contexts involving interaction with the computing device 102, examples of which may include:

Casual—determined when a user interacts with the computing device 102 without a keyboard or a mouse.

Desktop—determined when a user interacts with the computing device 102 using a keyboard and/or a mouse.

Professional—determined when a user interacts with the computing device 102 using a pen and/or a stylus.

Group—determined when the computing device 102 is connected to an external display device, such as to a television device using a High-Definition Multimedia Interface (HDMI) cable, or when a group of people is detected interacting with the computing device.

Fun—determined when a user interacts with the computing device 102 using a motion detecting device configured to detect full-body movements and gestures that are effective to control the computing device.

This list should not be construed as a limitation on the contexts that may be determined for a device, but rather merely as examples of contexts. The computing device 102 may, for instance, be associated with other hardware and thus other contexts may be determined based on the other hardware. As a result of advances in technology, user input received at a computing device is no longer limited to a traditional keyboard and mouse. The computing device 102 may, for instance, be associated with a tablet, such as over a network (e.g., the Internet), over Bluetooth and/or over other wireless mediums, such as a cellular network or WiFi. When the tablet is associated with the computing device 102, the tablet may be used as an input device and may display a user interface through which a user may control a display on the computing device, such as a display of content. In one or more embodiments, the computing device 102 may be associated with a mobile communications device. As in the tablet example, at least a portion of a user interface may be displayed on the mobile communications device to enable a user to control content displayed by the computing device 102. However, the user interface displayed on the tablet may be different than the user interface displayed on the mobile communications device. Additionally, the computing device 102 may be associated with varying combinations of the hardware mentioned above, and thus a device context may be determined based on a particular combination of hardware.

In addition, the device context module 116 is configured to track interactions of a user with the computing device 102. Accordingly, the device context module 116 may also determine the device context based on the tracked interactions. For example, the computing device may be connected to a mouse and a keyboard, but a user may interact with the device primarily using a stylus. The tracked interactions may therefore indicate that the user has a preference for interacting with the computing device using the stylus contrary to a hardware determination of a mouse and keyboard. As such, the device context module 116 may select the "professional" context, even though the computing device 102 is connected to the mouse and the keyboard.

The device context module 116 may also track a user's interactions with a particular application, e.g., application 202. For example, the user may primarily use touch functionality of the computing device 102 when interacting with application 202. Thus, the device context module 116 may automatically select the "casual" context for the application 202, such as whenever the application 202 is launched.

Further, the device context module 116 may track user interactions to determine a pattern of usage that is to be applied to a user's current session with the computing device 102. In a particular session with the computing device 102, for instance, a user may predominantly interact with the computing device in a particular manner. Using the tracked interactions from the current session, the device context module 116 may determine a device context for the current session that corresponds to the particular manner. The context determined for the current session may then be applied such that it is selected for any applications launched during the current session.

The device context module 116 may also be configured to determine a device context based on an amount of interaction that a user has with particular hardware items associated with the computing device 102. To do so, the device context module 116 may track an amount of time the user interacts with particular hardware associated with computing device 102. The amount of time the user interacts with the particular hardware may then be compared to the user's interactions with the computing device overall or relative to other hardware associated with the computing device. In this way, the device may determine what percentage of the user's interactions are associated with the particular hardware. Metrics other than a percentage of a user's interactions, but that are nonetheless indicative of an amount the user interacts with the particular hardware may also be derived from the tracked data, such as total accumulated time using the particular hardware, a rank of the particular hardware relative to other hardware, and so on.

The device context module 116 may then compare the amount of interaction to a threshold. Naturally, the device context module 116 may determine a different device context based on whether the amount of interaction over a monitored period of time exceeds the threshold or not. For example, when the computing device 102 is connected to a mouse and/or keyboard, the device context module 116 may determine an amount that the mouse and/or keyboard are being used. When the mouse and/or keyboard are used less than the threshold amount, the device context module 116 may select one context for the computing device 102. When the mouse and/or keyboard are used more than the threshold amount, however, the device context module 116 may select a different context for the computing device 102.

Other methods may also be used by the device context module 116 to determine a device context for the computing device 102. For example, the device context module 116 may employ weighted scores to select a context. To do so, the device context module 116 may be configured to provide scores for a variety of parameters used to determine a context. The device context module 116 may, for instance, provide a particular weighted score based on whether a tablet device is associated with and in communication with the computing device 102. The device context module may also provide a weighted score based on whether a keyboard and mouse are associated with the computing device. Based on an overall score, a context and thus a user interface configuration may be selected by the device context module 116.

In one or more embodiments, a user may provide input to the computing device 102 that expressly selects a context or a particular user interface configuration. Based on the express selection, the device context module 116 may be configured to change the context of the computing device 102 to correspond to the user's selection. An express selection by the user may be effective to override a context or particular user interface configuration determined by the device context module 116. For example, a user may expressly select a context associated with stylus input even though the device context module 116 determines a device context corresponding to input from a keyboard and/or mouse, such as when a stylus and keyboard and/or mouse are being used, but the keyboard and/or mouse are used more than the stylus.

In one or more embodiments, the device context module 116 may determine that more than one context applies based on the configuration of hardware associated with the computing device 102 and the tracked interactions of a user. As a result, the user may be presented with options that enable the user to select which context to use for configuring the user interface.

Further, the device context module 116 is configured to change the device context as the configuration of hardware associated with the device changes. The configuration of hardware associated with the computing device may change, for instance, when a user docks the computing device with a station that includes a mouse and/or a keyboard. Responsive to the docking, the device context module 116 may switch from one device context to another, e.g., from the "casual" context to the "desktop" context. The device context module 116 may determine to change the device context based on the addition or removal of hardware to the configuration of hardware associated with the computing device. The device context module 116 may also change the device context based on a reconfiguration of hardware associated with the computing device, such as when a protective cover of the computing device is reconfigured from a position in which it is folded as a stand against which the device can be propped like some framed pictures, to a position in which the cover lies flat against a back side of the device so it can be held in-hand like a notepad. In another example, the device context module 116 may change the device context when a tablet that is paired to a computing device is no longer being used to provide input to the computing device, and instead a keyboard and mouse are used to provide the input.

Based on the determined context of the device, the device context module 116 may select a user interface configuration for an application. For example, when the device context module 116 determines that the computing device 102 is being used in the "desktop" context, the device context module 116 may select a user interface configuration that is configured to facilitate user interactions primarily involving a mouse and/or keyboard. On the other hand, when the device context module 116 determines that the computing device 102 is being used in a "casual" context, the device context module may select a user interface configuration configured to facilitate user interactions that primarily involve touch functionality. Accordingly, the device context module 116 may select a user interface configuration that corresponds to the above noted contexts, e.g., a user interface configuration that supports the "professional" context, the "group" context, or the "fun" context. The device context module 116 may also select user interface configurations that correspond to contexts that have not been specifically enumerated herein.

Figure 3:
FIG. 3a is an example embodiment showing a user interface that is configured based on a device context.
FIG. 3b is an example embodiment showing the user interface configured differently than in FIG. 3a, based on a different device context.

A user interface 204 of application 202 may be configurable in a variety of different ways in accordance with the determined user interface configuration. Thus, when the user interface configuration is selected by the device context module 116, the user interface 204 of the application 202 may be configured according to the selected user interface configuration. Further, other components of the computing device 102, such as an operating system of the computing device, may configure user interfaces in accordance with the determined user interface configuration. The operating system of the computing device 102, for instance, may use the determined user interface configuration to configure a home screen or desktop of the operating system, screen savers, operating system tools, and so on. Returning to the discussion of the user interface 204 of application 202, each of the user interface configurations may be used to configure the user interface in a different way to facilitate particular interactions associated with the determined context. FIGS. 3a and 3b are examples of two different ways that a user interface of an application may be configured according to respective device contexts to support particular types of interactions.

FIG. 3a depicts generally, at 300, an example embodiment showing a user interface that is configured based on a device context. In the illustrated example, the computing device 102 may not be connected to a mouse and/or keyboard. Rather, a user of the computing device 102 may be interacting with the device using primarily touch functionality of the device. Thus, the device context module 116 may determine that the computing device is being used in a "casual" context, and select a user interface configuration that corresponds to the casual context.

Accordingly, the user interface 204 at example 300 may be configured to support interactions associated with the casual context, e.g., touch interactions. For example, the toolset 302 depicted on the left side of the user interface 204 at example 300 may include a limited number of the tools that are available through the application 202. However, the tools that are included in the toolset 302 at example 300 may be those that are particularly suited for touch interactions. Similarly, the panel 304 at the bottom of the user interface 204 at example 300 may include components such as sliders and selectable icons or thumbnails that are suited for touch interaction.

The user interface 204 depicted in FIGS. 3a and 3b may be associated with a photo editing application. Thus, the menus and tools of the user interface 204 may provide functionality for editing photos, such as the digital photo of the boy depicted in these figures. It follows that the menus and tools depicted as part of the user interface 204 at example 300 may be suited for performing photo editing tasks involving primarily touch functionality.

FIG. 3b depicts generally at 306 an example embodiment showing the user interface configured differently than in FIG. 3a, based on a different device context than in FIG. 3a.

In the example at 306, computing device 102 is illustrated as being connected to a keyboard 308. Although not shown, the computing device 102 at example 306 may also be connected to a mouse. Thus, the device context module 116 may determine that the computing device 102 is being used in a "desktop" context, and select a user interface configuration that corresponds to the desktop context.

Accordingly, the user interface 204 at example 306 may be configured to support interactions associated with the desktop context, e.g., keyboard and mouse centric interactions. The toolset 310 depicted on the left side of the user interface 204 at example 306 may include more tools than when the computing device is used in the casual mode. When the computing device is used in the desktop context, for instance, the full suite of tools may be made available via the user interface 204. Alternately, the tools that are included in the toolset 310 at example 306 may be those that are particularly suited for interactions involving a keyboard and/or mouse. Similarly, the panel 312 at the bottom of the user interface 204 in example 306 may include components such as sliders and menus that offer more advanced control of tasks than the components of panel 304. Additionally, when the user interface 204 is configured according to the desktop context, it may provide smaller buttons and more options than when configured for the casual context, it may include options for text input, and so on.

As noted above, the user interface 204 depicted in FIG. 3b may be associated with a photo editing application. Thus, the menus and tools of the user interface 204 at example 306 may provide functionality for editing photos that involves mouse and/or keyboard centric interactions.

In addition, particular workflows associated with an application may be presented differently according to the determined context of the device. Regarding the photo editing application for instance, one such work flow may correspond to cropping a digital photo. The interface displayed for cropping a photo when the device is used in a casual context may be different than the interface displayed for cropping a photo when the device is used in a desktop context.

Although FIGS. 3a and 3b are discussed as being associated with a casual and desktop context respectively, it should be appreciated that such discussion should not limit the scope of the invention described herein. For example, the user interface configuration depicted in FIG. 3a may instead be associated with a context that is based on stylus input rather than touch input. In any case, the user interface for an application may be configured differently (e.g., with different tools, more tools, fewer tools, and so on), at different times, based on the configuration of hardware associated with the computing device 102, and based on how a user interacts with the computing device and/or the application.

Having discussed example details of the techniques for device context-based user interfaces, consider now some example procedures to illustrate additional aspects of the techniques.

Example Procedures

This section describes example procedures for device context-based user interfaces in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that makes use of a device context module 116.

Figure 4:
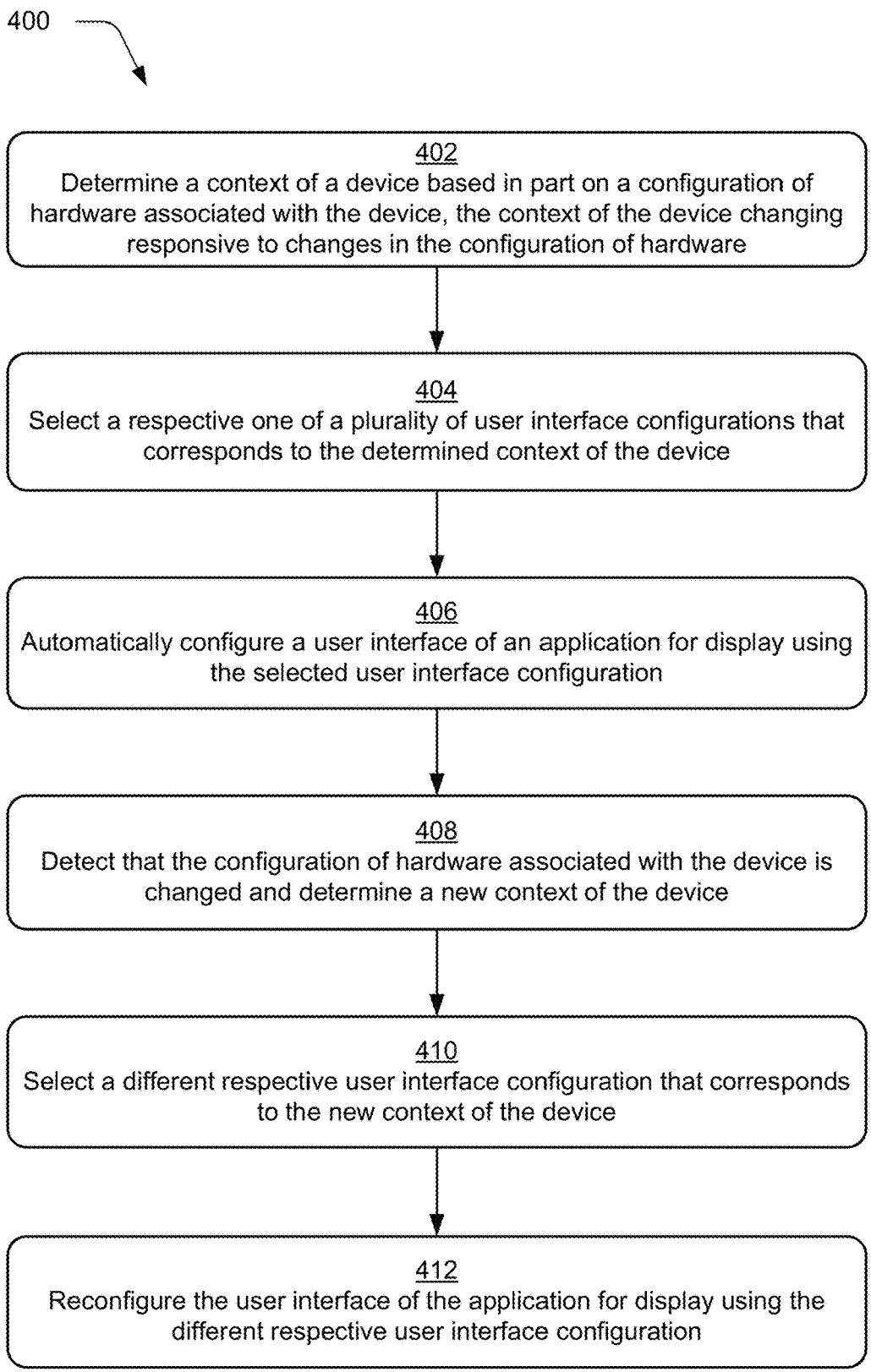
FIG. 4 is a flow diagram depicting an example procedure in accordance with one or more embodiments.

FIG. 4 depicts an example procedure 400 in which a context of a device may be determined and a user interface of an application configured to reflect the determined context. A context for a device is determined based in part on a configuration of hardware associated the device (block 402). For example, the device context module 116 of computing device 102 may determine that the keyboard 308 is connected to computing device 102. Accordingly, the device context module 116 may determine a context for the computing device 102 that is associated with having the keyboard 308 connected to the computing device, such as the desktop context described above. Further, the context of the device may change when the configuration of hardware associated with the device changes. For example, the context of the computing device 102 may be different when the computing device is connected to the keyboard 308 than when the computing device is not connected to the keyboard. In other examples, the context for the device may be determined based on whether a webcam is associated with the device to receive input (e.g., the webcam is turned on), whether a microphone is associated with the device to receive input (e.g., the microphone is turned on or is unmuted), and whether sensors such as 3D gesture sensors, touch sensors, and the like are associated with the device to receive input (e.g., the sensors are activated).

One of multiple user interface configurations is selected that corresponds to the determined context of the device (block 404). For example, the device context module 116 may select a user interface configuration to facilitate keyboard and/or mouse interaction when the device context module determines that the computing device 102 is being used in the desktop context.

Using the selected user interface configuration, a user interface of an application is automatically configured (block 406). For example, the user interface 204 of application 202 may be configured according to the selected user interface configuration. When a user interface configuration is selected to facilitate keyboard and/or mouse interaction, the user interface 204 may be configured such that components of the user interface are suited for interaction that primarily involves a keyboard and/or a mouse. For example, the user interface 204 may be configured with a full suite of tools available through the application 202 and may allow for text inputs. The user interface 204 may be configured differently for a context associated with touch input, group editing, motion sensing input, stylus input, and so on.

A change in the configuration of hardware associated with the device may be detected and a new context of the device determined based on the change (block 408). For example, the keyboard 308 may be disconnected from the computing device 102. Accordingly, the device context module 116 may detect that the hardware associated with the computing device at that time is changed. As a result of the change to the hardware, the device context module 116 may determine that the computing device 102 is being used in a different context. When the keyboard 308 is disconnected, for instance, the device context 116 module may determine that the computing device is being used in a casual context rather than the desktop context. The device context module 116 may also determine that the computing device 102 is being used in a different context based on whether a webcam is associated with the device to receive input (e.g., the webcam is turned on), whether a microphone is associated with the device to receive input (e.g., the microphone is turned on or is unmuted), and whether sensors such as 3D gesture sensors, touch sensors, and the like are associated with the device to receive input (e.g., the sensors are activated).

Consequently, a different one of the multiple user interface configurations may be selected that corresponds to the new context of the device (block 410). For example, the device context module 116 may select a user interface configuration to facilitate interactions involving touch capabilities when the device context module determines that the computing device 102 is being used in the casual context. The user interface of the application may then be reconfigured for display using the different user interface configuration (block 412). When a user interface configuration is selected to facilitate interactions involving touch, the user interface 204 may be configured such that components of the user interface are suited for touch input. For example, the user interface 204 may be configured with a limited set of tools rather than a full suite of an application's tools. Additionally, the tools with which the user interface 204 is configured may include those tools that are determined to be particular suitable for touch input.

Furthermore, the user interface may be reconfigured according to the new context without switching to a different application. Using device context-based user interface techniques, a user may continue working in a particular application between hardware changes. For example, a user may continue working in a single application when the computing device 102 is connected with a keyboard and/or a mouse and also after the keyboard and/or mouse are disconnected from the computing device, albeit via a differently configured user interface.

Having described example procedures in accordance with one or more embodiments, consider now an example system and device that can be utilized to implement the various techniques described herein.

Example System and Device

Figure 5:
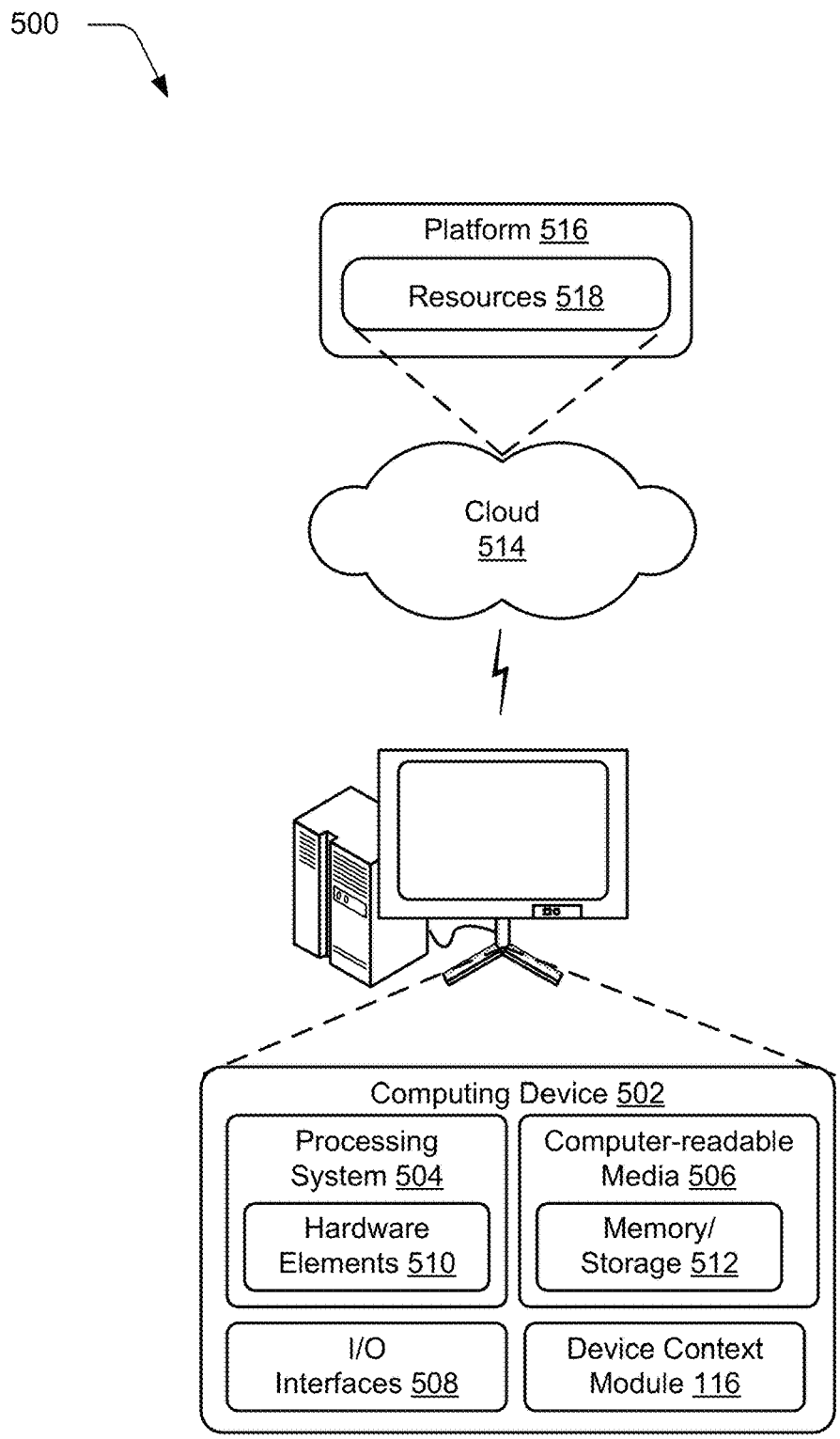
FIG. 5 illustrates an example system including various components of an example device that can be employed for one or more embodiments of a device context-based user interface described herein.

FIG. 5 illustrates an example system generally at 500 that includes an example computing device 502 that is representative of one or more computing systems and/or devices that may implement the various techniques described herein. This is illustrated through inclusion of the device context module 116, which operates as described above. The computing device 502 may be, for example, a server of a service provider, a device associated with a client (e.g., a client device), an on-chip system, and/or any other suitable computing device or computing system.

The example computing device 502 is illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
   a device context module implemented at least partially in hardware, the device context module configured to perform operations comprising:
      tracking interactions of a user with the device;
      determining a context of the device based in part on a configuration of hardware associated with the device and in part on determining that the user predominantly interacts with the device in a particular manner from a pattern of usage determined for the user's current session based on an amount of interaction time the user has with different items of the hardware, the context of the device changing responsive to changes in the configuration of hardware associated with the device and changes in the amount of interaction time the user has with the different items of hardware,
         wherein the context of the device is based in part on whether the configuration of hardware includes a particular hardware item associated with the device, and
         wherein the context of the device is further determined based in part on an amount of time that the particular hardware item is being used over a monitored period of time, the context of the device being different when the amount of time the particular hardware item is used is less than a threshold amount over the monitored period of time than when the amount of time the particular hardware item is used is more than the threshold amount over the monitored period of time;
      selecting a respective one of a plurality of user interface configurations that corresponds to the determined context of the device, the selected user interface configuration supporting operations in the determined context of the device by displaying a combination of user interface instrumentalities suited for performing the operations according to the pattern of usage determined for the user's current session; and
      automatically configuring a user interface of an application for display using the selected user interface configuration.

2. A device as described in claim 1, wherein the operations further comprise:
   detecting that the configuration of hardware associated with the device is changed and determining a new context of the device based in part on detecting the changed configuration;
   selecting a different respective user interface configuration that corresponds to the new context of the device; and
   reconfiguring the user interface of the application for display using the different respective user interface configuration.

3. A device as described in claim 2, wherein the change to the configuration of hardware involves one of associating an additional hardware item with the device or disassociating an associated hardware item from the device.

4. A device as described in claim 2, wherein the user interface is automatically reconfigured for output in association with the application without switching to another application.

5. A device as described in claim 1, wherein the context of the device is based in part on determining the particular manner that the user predominantly interacts with the device by comparing amounts of time that the different items of hardware are used over the monitored period of time relative to one another.

6. A device as described in claim 1, wherein the context of the device is based in part on determining the particular manner that the user predominantly interacts with the device by ranking the different items of hardware according to amounts of time that the different items of hardware are used over the monitored period of time.

7. A device as described in claim 1, wherein the context of the device is based in part on determining the particular manner that the user predominantly interacts with the device based on comparing amounts of time that the different items of hardware are used relative to an overall amount of time the user interacts with the device.

8. A device as described in claim 1, wherein the context of the device is based in part on whether the configuration of hardware supports touch functionality, at least one of the plurality user interface configurations configured to facilitate interaction that is performed substantially using the touch functionality.

9. A device as described in claim 1, wherein the device context module is implemented at least partially in software and configured as a component of the application.

10. A device as described in claim 1, wherein the device context module is implemented at least partially in software and configured as a component of an operating system of the device and is accessible to multiple applications.

11. A method comprising:
    tracking interactions of a user with a device;
    determining a context of the device based in part on a configuration of hardware associated with the device and in part on determining that the user predominantly interacts with the device in a particular manner from a pattern of usage determined for the user's current session based on an amount of interaction time the user has with different items of the hardware, the context of the device changing responsive to changes in the configuration of hardware associated with the device and changes in the amount of interaction time the user has with the different items of hardware, wherein the context of the device is based in part on whether the configuration of hardware includes a particular hardware item associated with the device, and wherein the context of the device is further determined based in part on an amount of time that the particular hardware item is being used over a monitored period of time, the context of the device being different when the amount of time the particular hardware item is used is less than a threshold amount over the monitored period of time than when the amount of time the particular hardware item is used is more than the threshold amount over the monitored period of time;

selecting a respective one of a plurality of user interface configurations that corresponds to the determined context of the device; and automatically configuring a user interface of an application for display using the selected user interface configuration.

12. A method as described in claim 11, further comprising:

detecting that the configuration of hardware associated with the device is changed and determining a new context of the device based in part on detecting the changed configuration;

selecting a different respective user interface configuration that corresponds to the new context of the device; and reconfiguring the user interface of the application for display using the different respective user interface configuration.

13. A method as described in claim 12, wherein the user interface is automatically reconfigured for output in association with the application without switching to another application.

14. A method as described in claim 12, wherein the user interface is automatically reconfigured for output responsive to detecting the changed configuration, the changed configuration detected based on one of associating an additional hardware item with the device or disassociating an associated hardware item from the device.

15. One or more computer-readable media comprising instructions stored thereon that, responsive to execution by a computing device, cause the computing device to implement a device context module configured to perform operations including:

tracking interactions of a user with the computing device;

determining a context of the computing device based in part on a configuration of hardware associated with the computing device and in part on determining that the user predominantly interacts with the device in a particular manner from a pattern of usage determined for the user's current session based on the tracked interactions of the user with the computing device that describe an amount of interaction the user has with different items of the hardware, the context of the computing device changing responsive to at least one of changes in the configuration of hardware associated with the computing device or changes of the interactions of the user with the computing device, including changes of the amount of interaction the user has with the different items of hardware, wherein the context of the device is based in part on whether the configuration of hardware includes a particular hardware item associated with the device, and wherein the context of the device is further determined based in part on an amount of time that the particular hardware item is being used over a monitored period of time, the context of the device being different when the amount of time the particular hardware item is used is less than a threshold amount over the period of time than when the amount of time the particular hardware item is used is more than the threshold amount over the period of time;

selecting a respective one of a plurality of user interface configurations that corresponds to the determined context of the computing device; and automatically configuring a user interface of an application for display using the selected user interface configuration.

16. One or more computer-readable media as described in claim 15, wherein the application comprises a photo editing application and at least one of the plurality of user interface configurations is configured to facilitate interaction with the photo editing application that is performed substantially with at least one of a mouse or a keyboard.

17. One or more computer-readable media as described in claim 15, wherein a different one of the plurality of user interface configurations is configured to facilitate interaction with the photo editing application that is performed substantially using touch functionality of the computing device.

18. One or more computer-readable media as described in claim 15, wherein the operations further comprise:

detecting that the configuration of hardware associated with the device is changed and determining a new context of the device based in part on detecting the changed configuration;

selecting a different respective user interface configuration that corresponds to the new context of the device; and reconfiguring the user interface of the application for display using the different respective user interface configuration.

19. One or more computer-readable media as described in claim 18, wherein the user interface is automatically reconfigured for output in association with the application without switching to another application.

20. One or more computer-readable media as described in claim 18, wherein the user interface is automatically reconfigured for output responsive to detecting the changed configuration, the changed configuration detected based on one of associating an additional hardware item with the device or disassociating an associated hardware item from the device.

* * * * *